United States Patent [19]

Markarian et al.

[11] 4,266,332
[45] May 12, 1981

[54] THIN ELECTROLYTIC CAPACITOR MANUFACTURE

[75] Inventors: Mark Markarian, Williamstown; Henry F. Puppolo, North Adams, both of Mass.

[73] Assignee: Sprague Electric Company, North Adams, Mass.

[21] Appl. No.: 26,466

[22] Filed: Apr. 2, 1979

[51] Int. Cl.³ .............................................. H01G 9/10
[52] U.S. Cl. ..................................... 29/570; 361/433
[58] Field of Search ................. 29/579; 361/308, 301, 361/433

[56] References Cited

U.S. PATENT DOCUMENTS

| | | | |
|---|---|---|---|
| 2,028,775 | 1/1936 | Hetenyi | 361/433 |
| 2,033,309 | 3/1936 | Siegmund | 361/433 |
| 3,024,394 | 3/1962 | Salisbury | 361/308 |
| 3,265,945 | 8/1966 | Jennings | 361/301 |
| 3,353,072 | 11/1967 | Peck | 361/433 |
| 3,431,473 | 3/1969 | Cormier | 361/301 |
| 3,654,524 | 4/1972 | Puppolo | 361/433 |
| 4,039,905 | 8/1977 | Pearce et al. | 361/433 |

FOREIGN PATENT DOCUMENTS

| | | | |
|---|---|---|---|
| 2131328 | 1/1973 | Fed. Rep. of Germany | 29/570 |
| 2726768 | 12/1978 | Fed. Rep. of Germany | 29/570 |
| 376694 | 7/1932 | United Kingdom | 29/570 |
| 1558945 | 1/1980 | United Kingdom | 29/570 |

*Primary Examiner*—Aaron Weisstuch
*Attorney, Agent, or Firm*—Connolly and Hutz

[57] ABSTRACT

A flat electrolytic capacitor section is provided with a vapor barrier by sealing the section in an insulating, heat-sealable polyester, polyolefin, perflouroethylene, or cellophane film.

5 Claims, 3 Drawing Figures

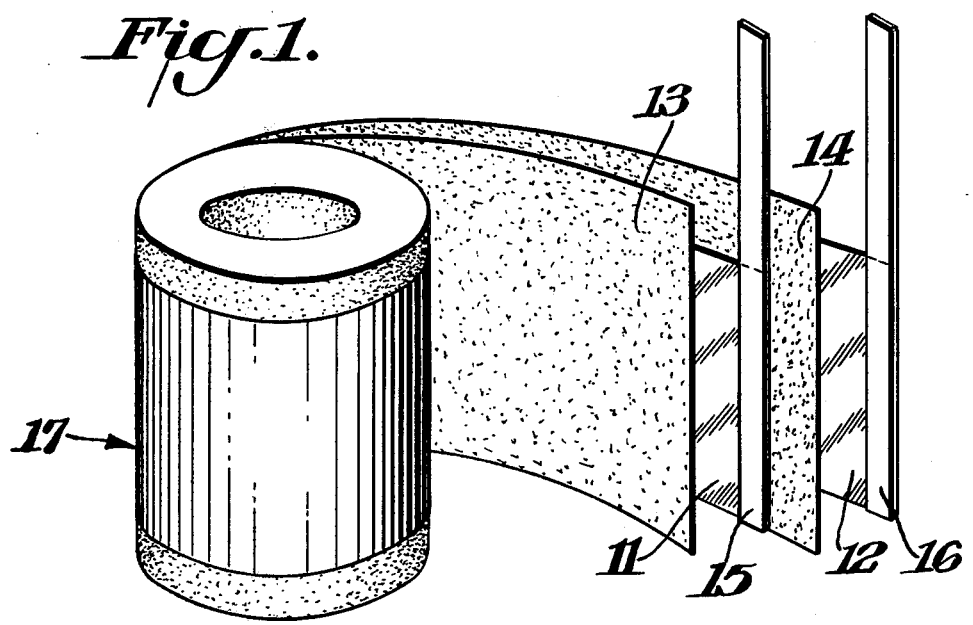
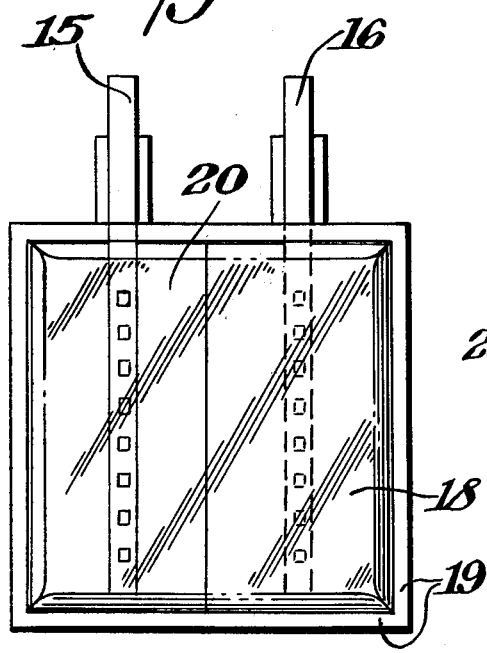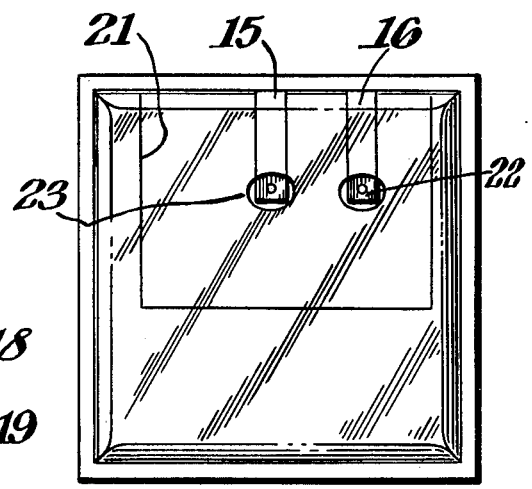

THIN ELECTROLYTIC CAPACITOR MANUFACTURE

BACKGROUND OF THE INVENTION

This invention relates to the sealing of a flattened electrolytic capacitor section to provide a vapor barrier.

It is known to produce flattened electrolytic capacitor sections with extended anode and cathode foils which are electrically connected respectively to each other and a plurality of such units are connected to respective terminal strips. Then the units are placed in a container with electrolyte and sealed.

It would be desirable for certain applications to provide a thinline single unit capacitor.

SUMMARY OF THE INVENTION

One of the purposes of this invention is to provide a sealed flat, thin electrolytic capacitor having a vapor barrier that prevents moisture from entering the wound section and prevents electrolyte components from seeping out or evaporating.

According to the present invention, a wound capacitor section with attached electrode tabs is lightly flattened, impregnated with electrolyte, aged, compressed to completely flatten the unit and squeeze out excess electrolyte, re-aged, and sealed in a material which serves as a vapor barrier and a packaging material.

Specifically, the flattened, impregnated unit is placed between layers of a heat-sealable film with the electrode tabs extending beyond the edges of the material. Hotmelt or other compatible adhesive is applied to the tabs to ensure bonding of the film material to the metal tabs. The unit is then sealed all around the periphery. The film material envelops the section, insulates it, and provides a vapor barrier to keep moisture out and electrolyte in.

If the sections are small, e.g., only a relatively few turns of foil, the resulting package may be too flexible and delicate for use in this form. Then, after making the lead attachments to the tabs, the units can be provided with another covering to provide the desired rigidity, i.e., epoxy resin, silicone rubber. Any of the units may be so treated or inserted into preformed cases.

BRIEF DESCRIPTION OF THE DRAWINGS

FIG. 1 is a view of a rolled capacitor section before flattening.

FIG. 2 is a view of a sealed flattened section.

FIG. 3 is a top view of a different embodiment of a sealed flattened section.

DESCRIPTION OF THE PREFERRED EMBODIMENTS

Referring to the drawings, FIG. 1 shows a capacitor section 17 partially unrolled in which 11 and 12 are electrode foils, at least one of which has a barrier layer dielectric oxide thereon, separated by spacer material 13 and 14, which may be paper, film or a combination thereof, and having electrode tabs 15 and 16 attached to electrodes 11 and 12, respectively.

FIG. 2 shows the capacitor section of FIG. 1 flattened and enveloped in sheets of a heat sealable material 18 through which the electrode tabs 15 and 16 extend and heat-sealed around the periphery indicated by 19. Preferably, both sheets extend up the tabs and are trimmed after sealing to the indicated shape. An extra layer 20 of the heat-sealable material is shown along the length of the extended tab terminal for extra adherence to the metal of the tab.

FIG. 3 is a top view of another embodiment of the sealed flattened section. It differs from that shown in FIG. 2 in that it provides for a compact snap-in type unit instead of a plug-in type unit of FIG. 2. In order to prevent any contact of the tabs with the capacitor section, a layer of film material 21, adhesive side up, is placed on one side of the flattened section. Electrode tabs 15 and 16 are bent over and contact the adhesive. The unit is placed between layers of adhesive-coated heat-sealable film, adhesive sides facing each other, and heat-sealed. Holes 22 and 23, which may be pre-cut or cut after sealing, are located over the ends of the electrode tabs 15 and 16 to allow connection of leads, preferably of the button-type for snap connection of the capacitor.

Capacitor section 17 is made by winding anodized, etched aluminum foil 11 and etched aluminum cathode foil 12 with interleaved paper spacers 13, 14 on a larger-than-usual mandrel, and then electrode tabs 15 and 16 are affixed to the anode and cathode foils, respectively. After taping to secure the section, it is lightly flattened, e.g., by hand pressure, and then impregnated with electrolyte, preferably one that becomes solid at room temperature. After aging, the sections are compressed, e.g., at 35–70 psi, to flatten them and squeeze out excess electrolyte and are then re-aged.

The thin flat section 17 is placed between layers of an adhesive-coated heat-sealable film material 18, and hotmelt or other compatible adhesive is spread on that portion near the electrode tabs to ensure bonding of the film to the metal tabs. The tabs 15 and 16 extend beyond the edges of the material so that external leads can be attached without interference from the material. The unit is then heat-sealed around its entire periphery 19, thus providing a package which acts as vapor-barrier and also to prevent loss of electrolyte. If more rigidity is required, the units, after the lead attachments are made, may be placed in preformed cases or encased in epoxy resin or silicon rubber.

The preferred heat-sealable material may be a polyester, polyolefin, perfluoroethylene, or cellophane film, but other heat-sealable materials may be used providing they are compatible with the capacitor and electrolyte materials. Alternately, when extra vapor-barrier protection is required, a polymer-aluminum foil-polymer laminate may be used as above with the foil providing a redundant vapor barrier layer.

What is claimed is:

1. The method of producing a flat electrolytic capacitor section with a vapor barrier comprising the steps of winding anode and cathode foils with interleaved spacers and attaching electrode tabs to form a capacitor section and partially flattening said section, impregnating with electrolyte, and compressing said section to complete the flattening and squeeze out excess electrolyte, then thermally sealing said section in a heat sealable vapor-barrier material chosen from the group consisting of films of polyester, perfluoroethylene, cellophane, polyolefin, and laminates thereof with aluminum foil in the form of a polymer-foil-polymer laminate, said heat-sealable material being adhesive-coated, said sealing being attained by placing said section between layers of said heat sealable material, said electrode tabs extending beyond said section and beyond the edges of said heat sealable material, said heat sealable material enveloping said section and extending to a point on said tabs short of the site of a tab-lead connection, placing an adhesive between said tabs and that portion of said heat sealable material adjacent said tabs, and heat-sealing said heat sealable material at least all around the periphery of said section including said tabs to provide a sealed section having said vapor barrier.

2. A process according to claim 1 wherein said sealed section is further encased to provide extra rigidity in a packaging material chosen from the group consisting of preformed cases, epoxy resin, and silicone rubber.

3. A process according to claim 1 wherein a layer of said heat-sealable material is placed along the length of said attached electrode tabs to ensure sealing of the metal of said tabs to said heat sealable material.

4. A process according to claim 1 wherein a single layer of said heat-sealable material is adhesive-coated and is placed adhesive-side up on one flattened side of said section, said tabs are bent over and adhered to said layer, and then said section is sealed by placing it between layers of said heat-sealable material and heat-sealing said material around the periphery of said section to provide a sealed section having said vapor barrier.

5. A process according to claim 4 wherein the outer heat-sealable layer over said electrode tabs has holes therein in registry with the ends of said tabs to provide sites for the attachment of leads.

* * * * *